April 6, 1965   B. H. WITTLER   3,176,561
CUTTING MACHINE HAVING MEASURING MEANS TO ACTUATE THE CUTTER
Filed June 25, 1962   3 Sheets-Sheet 1

WITNESS
Nicholas Leszczak

INVENTOR.
BERNARD H. WITTLER
BY Edward L Bell
ATTORNEY

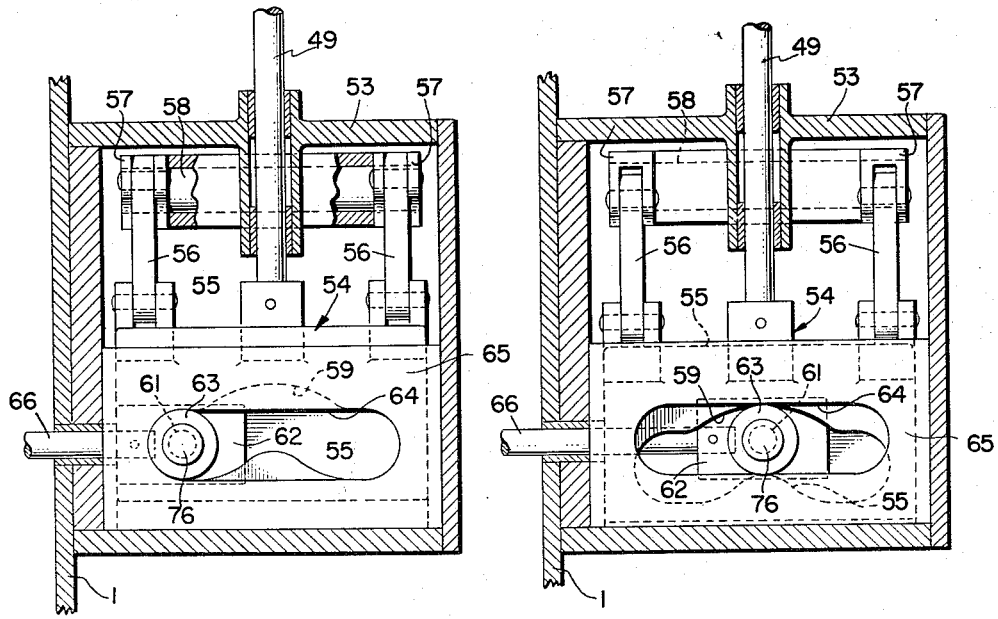
Fig. 4.   Fig. 5.
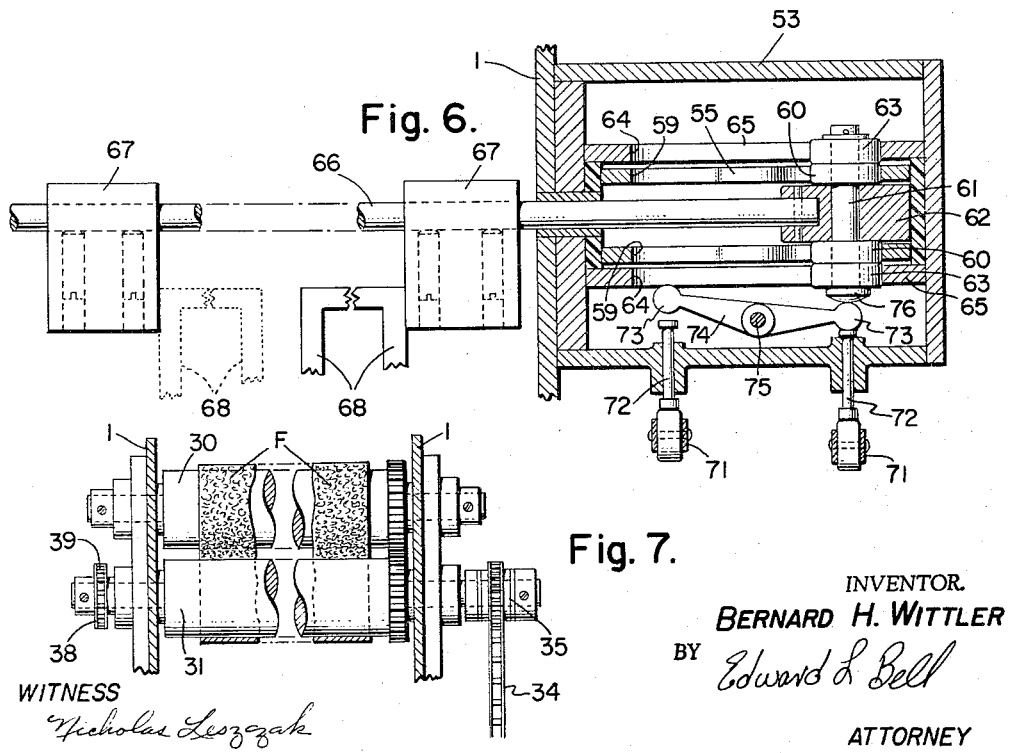
Fig. 6.
Fig. 7.

United States Patent Office 3,176,561
Patented Apr. 6, 1965

3,176,561
CUTTING MACHINE HAVING MEASURING
MEANS TO ACTUATE THE CUTTER
Bernard H. Wittler, Rossville, Ga., assignor, by mesne assignments, to The Singer Company, New York, N.Y., a corporation of New Jersey
Filed June 25, 1962, Ser. No. 204,905
7 Claims. (Cl. 83—222)

The present invention relates to a cutting machine and particularly to a machine for transversely cutting into a succession of pieces of predetermined length a web of fabric material such as carpet or bedspreads which may be in the order of several feet in width and hundreds of feet in length.

The object of this invention is to provide such a cutting machine which is completely automatic and fast in operation, and which is economical, dependable, durable and efficient.

A further object of this invention is to provide such a cutting machine which is adapted to be used in conjunction with and on the discharge side of a tufting machine whereby the fabric from the tufting machine will be automatically severed into pieces of a predetermined length.

In accordance with the above, there is provided by the present invention a cutting machine which includes a fabric feed mechanism, a carriage movable relatively to the fabric to be severed and having a cutting blade and a reversible drive means, preferably a reversible electric motor, for driving the carriage and actuating the cutting blade, together with controls for automatically stopping the fabric feed mechanism after a predetermined length of fabric has been advanced and simultaneously initiating operation of the carriage drive means to move the carriage from one end of the machine to the other, and controls responsive to the completion of a single pass of the carriage and its cutter relatively to the fabric for stopping the carriage drive means, re-initiating operation of the fabric feed mechanism and reversing the carriage drive means for the next operation wherein the carriage will be moved in the opposite direction from one end of the machine to the other. To adapt the machine for use at the discharge side of a tufting machine, the fabric feed mechanism is adapted to be driven, preferably from a power take-off on the tufting machine, through an over-running clutch whereby the cutting machine will be operated only when the tufting machine is operated and the fabric feed can be stopped for the cutting operation. The fabric feed of the cutting machine in such an installation will be at a speed greater than the discharge speed of the tufting machine so that the cutting machine will in effect be able to catch up after a cutting operation and, when the slack fabric has been removed, the over drive will be taken up in the over-running clutch.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings in which:

FIG. 4 is a fragmentary sectional view taken substantially on the line 4—4 of FIG. 1.

FIG. 5 is a fragmentary sectional view similar to FIG. 4 and illustrating the parts in a different operative position.

FIG. 6 is a fragmentary sectional view taken substantially in the line 6—6 of FIG. 1.

FIG. 7 is a fragmentary detail view showing the drive for the fabric feed rolls of the present machine.

Figure 1:
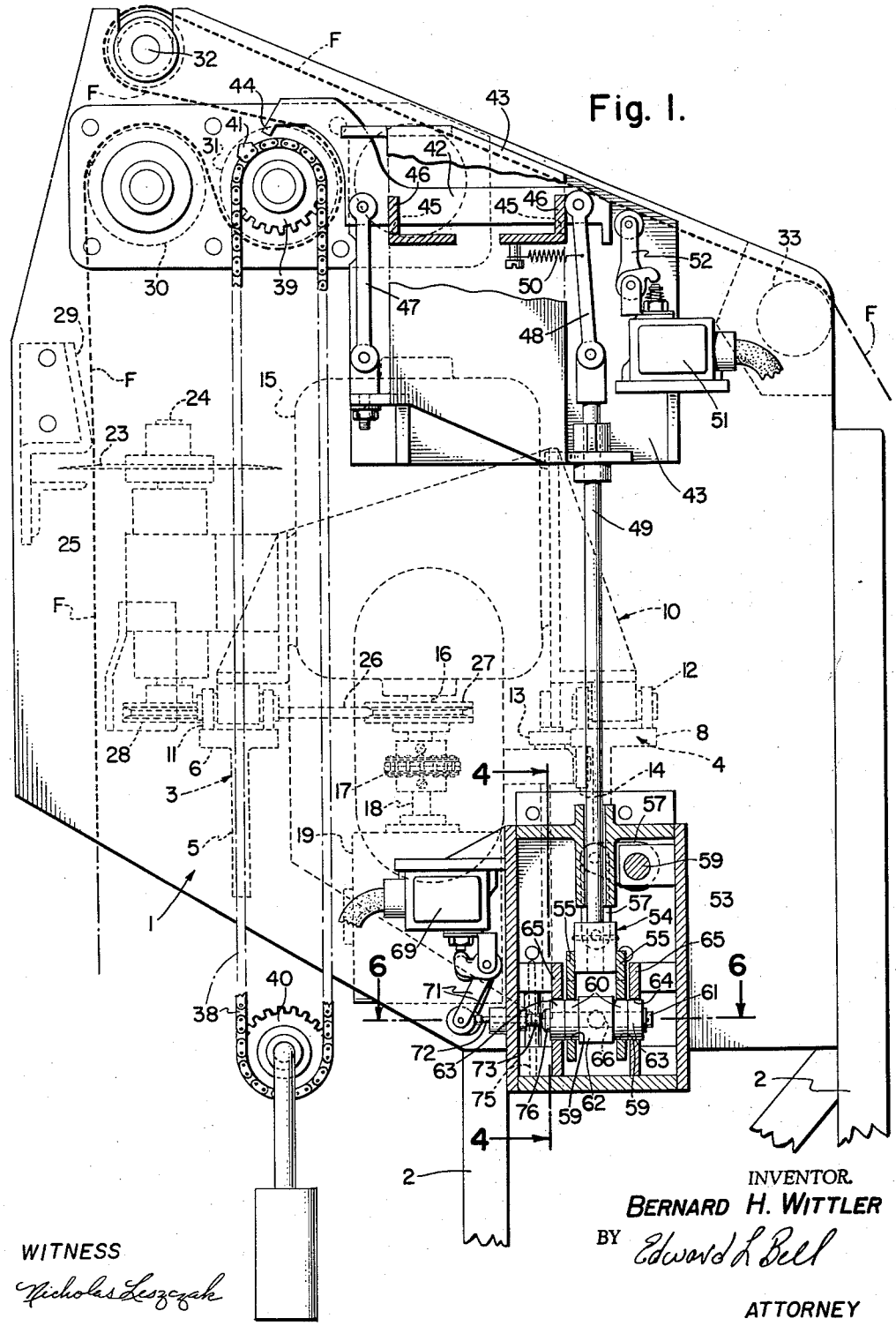
FIG. 1 is a fragmentary end elevational view, partly broken away and in section, of a cutting machine in accordance with this invention.
Figure 2:
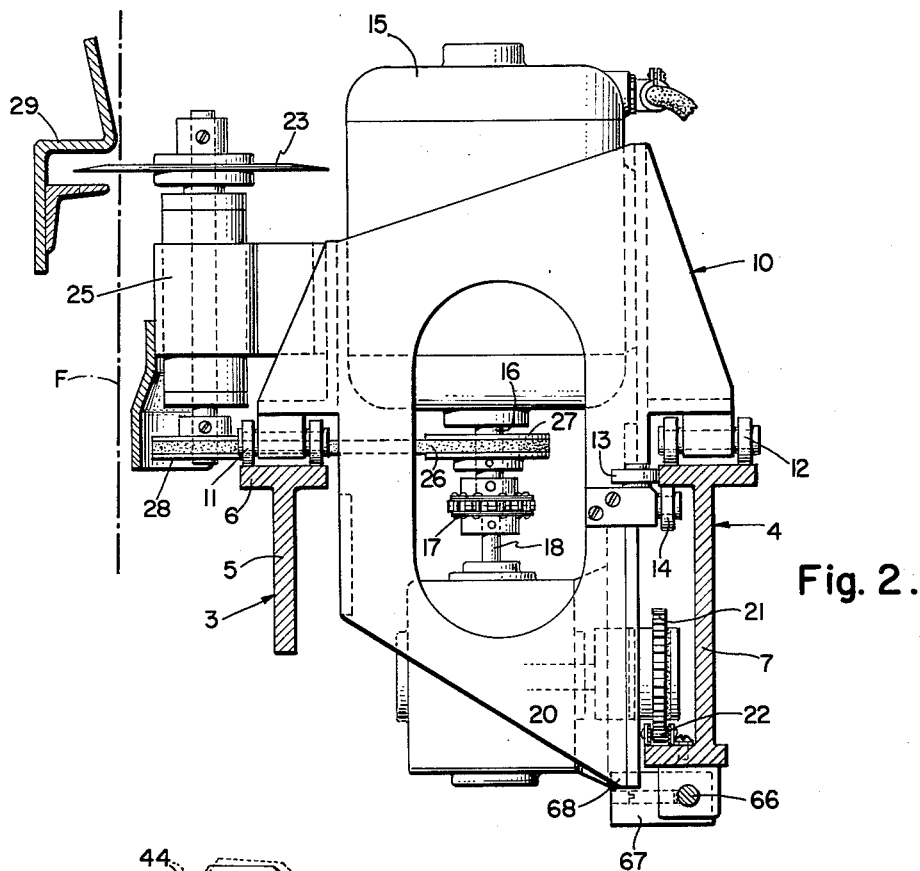
FIG. 2 is a detail view of the cutting mechanism and the carriage therefor of the machine of FIG. 1.

With reference to the drawings, there is illustrated a cutting machine having a frame including an end plate 1 supported by legs 2. While only one such end plate 1 is illustrated in the drawings, it will be understood that the machine comprises two opposed end plates 1, one disposed at each end of the machine and which are spaced apart a distance sufficient to accommodate widthwise the fabric to be cut.

Secured at their ends to the end plates 1 and extending therebetween are a pair of track members or rails 3 and 4. The rail 3 is T-shaped and includes a vertical web 5 with a horizontal flange 6 at the top thereof while the rail 4 is substantially I-shaped and includes a vertical web 7 with horizontal flanges 8 and 9 at the top and bottom thereof respectively. The rails 3 and 4 are disposed in spaced relation with the top flanges 6 and 8 disposed in the same horizontal plane.

A carriage 10 is mounted on the rails 3 and 4 by means of two pairs of wheels 11 and 12 riding respectively on the flanges 6 and 8. While not shown, a further pair of wheels such as the wheels 11 and 12 are provided to stabilize the carriage 10 on the rails. The carriage 10 also includes wheels 13 cooperating with the edge of the flange 8 to guide the carriage and wheels 14 cooperating with the underside of the flange 8 to hold the carriage on the rails.

The carriage 10 includes a reversible electric motor 15 which, for propelling the same along the rails 3 and 4, has the drive shaft 16 thereof connected by a coupling 17 to the input shaft 18 of a gear-type reduction unit 19, the output shaft 20 of which carries a sprocket 21 that cooperates with a chain 22 secured to the upper surface of the flange 9. Thus, upon actuation of the motor 15, rotation is imparted to the sprocket 21 which, through its cooperation with the chain 22, moves the carriage transversely of the machine along the rails 3 and 4.

The cutting mechanism comprises a rotary cutting blade 23 mounted on a vertical shaft 24 journaled in an arm 25 extending from the carriage 10. The blade 23 is also driven by the motor 15 by a belt 26 that runs about a pulley 27 on the shaft 16 of the motor and a pulley 28 on the shaft 24. The blade 23 extends into a channel in a bar 29 that extends between the end plates 1 and serves as a shoe or backing to hold the fabric F in cooperation with the blade.

Extending between and journaled in the end plates 1 are a pair of fabric feed rolls 30 and 31 and an idler roll 32. As indicated in FIG. 1, the fabric F runs over a guide bar 33, around the idler roll 32, through an S-curve around the feed rolls 30 and 31, and then down between the bar 29 and the cutting blade 23. The feed roll 31 is driven by a chain 34 through an over-running clutch 35. With the cutting disposed on the discharge side of a tufting machine, the power for driving the feed roll 31 may be taken directly from the tufting machine. However, this power may be from any convenient source. The feed roll 30 is also driven, as from the feed roll 31 by the gears 36 and 37.

The measuring and controlling mechanism for the cutting machine comprises an endless measuring element, i.e., a measuring chain 38, entrained about a sprocket 39 on the feed roll 31 on the outside of the end plate 1 at the end opposite from the end on which the clutch 35 is mounted. The chain 38 is held extended by a weighted sprocket 40 and includes an abutment element in the form of a high link 41. On the frame of the machine there is a cooperating abutment member in the form of a floating link 42 mounted in a housing 43 secured to the end plate 1 and having a free end 44 that is adapted to be engaged by the high link 41 of the measuring chain. The floating link 42 is guided by slots 45 in bars 46 in the housing 43 and is mounted for parallel motion by a pair of anchor links 47 and 48, both of which are pivotally connected at their upper ends to the floating link 42 and at their lower ends are pivotally mounted respectively on the housing 43 and the upper end of a normally stationary actuating rod 49.

The floating link 42 is normally disposed with the free end 44 thereof closely adjacent to the periphery of the measuring chain 38 as it passes about the sprocket 39 and in position to be engaged by the high link 41, as illustrated in FIG. 1. As the feed roll 31 is rotated, as indicated by the arrow A in FIG. 1, the high link 41 will engage the free end 44, thereby forcing the floating link 42 rearwardly until the anchor link 47 engages the adjacent bar 46, as illustrated in the full line position in FIG. 3. The measuring chain 38 and thus the feed roll 31 are mechanically blocked against further rotation, thereby stopping the feeding of the fabric F. As illustrated by the dotted lines in FIG. 3, when the actuating rod 49 is lowered, the floating link 42 is pivoted about the anchor link 47 to lift the free end 44 thereof clear of the high link 41 of the measuring chain to permit resumption of rotation of the feed roll 31 and thus the feeding of the fabric F. A spring 50 is arranged between the anchor link 48 and the adjacent bar 46 to bias the floating link 42 forwardly toward the normal position as illustrated in FIG. 1.

A normally open switch 51 is mounted on the housing 43 with a trip arm 52 thereof in position to be engaged by the end of the floating link 42 when it is forced rearwardly by the high link 41 of the measuring chain. The switch 51 controls the actuation of the motor 15 so that when the switch is closed, which will be when the fabric feed is stopped, the motor 15 is energized, thereby driving the carriage 10 along the rails 3 and 4 from one end of the machine to the other and with the cutting blade 23 rotating to sever the fabric F.

The rod 49 extends downwardly into a housing 53 mounted on the end plate 1 and at its lower end is connected to a vertically movable block 54 that includes a pair of depending cam plates 55 and is held against binding by a pair of anchor links 56 pivotally connected thereto at its opposite ends and to crank arms 57 on a common shaft 58 journaled in the housing 53. The cam plates 55 have cam slots 59 which are substantially horizontal and are characterized by a vertical rise in the center thereof. Disposed in the cam slots 59 are a pair of rollers 60 on a shaft 61 mounted in a block 62. Also mounted on the shaft 61 outwardly of the rollers 60 are a further pair of rollers 63 which are disposed in straight horizontal slots 64 in stationary plates 65 mounted in the housing 53, thereby confining the block 62 to straight line horizontal motion as it is moved back and forth in the housing 53 and accordingly, through the cam slots 59, raising and lowering the block 54 and the rod 49.

A horizontal endwise-shiftable rod 66 extends transversely of the machine between the end plates 1 and parallel to the rails 3 and 4. The rod 66 extends into the housing 53 with the end thereof connected to the block 62. Mounted upon the rod 66 are a pair of stationary abutments or stops 67 each of which is disposed adjacent to but spaced inwardly from one of the end plates 1 and which are in a position to be engaged by an arm 68 extending from the carriage 10.

Mounted on the outside of the housing 53 are a pair of reversing switches 69 for the motor 15. The switches include trip arms 71 that are adapted to be actuated by push rods 72 mounted for endwise sliding in the wall of the housing 53 and in position to be actuated selectively by the opposite ends 73 of a lever 74 pivoted intermediate its ends on a pivot pin 75 mounted in the housing. The ends 73 of the lever 74 are disposed to be engaged by a button 76 on the end of the shaft 61 in the block 62 when the block 62 is in its extreme positions. The switches 69 and 70 are thus alternately actuated and are connected into the circuit of the motor 15 such that the motor 15 will be energized either forwardly or in reverse when the switch 51 is closed.

The operation of the machine is as follows. The machine is normally at rest during the feeding of the fabric F by the feed roll 31, with the carriage 10 disposed at one end of the machine beyond the edge of the fabric. As the feed roll 31 rotates to advance the fabric, the measuring chain 38 is also advanced. After feeding a preselected length of the fabric, which is determined by the length of the measuring chain 38, the high link 41 engages one end 44 of the floating link 42. The link 42 is thus forced rearwardly to the full line position in FIG. 3 which mechanically stops the rotation of the feed roll 31, the continued drive through the driving chain 34 being taken up in the over-running clutch 35. At the same time, the switch 51 is closed by the rearward movement of the floating link 42 to energize the motor 15 so that it will advance the carriage 10 from the one end of the machine to the other, severing the fabric as it advances. Upon approaching the other end of the machine, the arm 68 of the carriage 10 engages the stop 67 on the rod 66 forcing the rod 66 endwise. As the rod 66 moves endwise, toward the right from the position illustrated in FIG. 4, the cooperation of the rollers 60 with the rise in the center of the cam slots 59 in the cam plates 55 force the block 54 and the rod 49 with it, downwardly, FIG. 5. The continued movement of the block 62 from the center of the cam slots 59, FIG. 5, to the other end thereof, raises the block 54 and the rod 49 to restore the same to the normal position.

Figure 3:
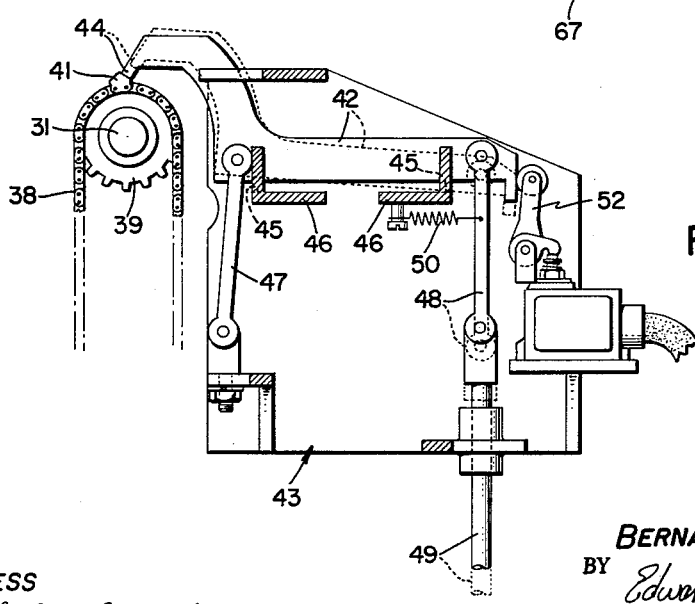
FIG. 3 is a detail view of a portion of FIG. 1 and illustrating the parts in a different operative position.

The momentary lowering of the rod 49, causes the floating link 42 to pivot, as illustrated in the dotted line position in FIG. 3, thereby releasing the high-link 41 and permitting the feed roll 31 to rotate. The subsequent raising of the rod 49 restores the floating link to its normal operative position as shown in FIG. 1 where the free end 44 thereof will again be engaged by the high-link 41 after another preselected length of fabric has been fed. Immediately upon raising the free end 44 of the floating link 42, the spring 50 forces the link 42 forwardly thereby releasing the trip arm 52 of the switch 51 and de-energizing the motor 15 at the end of the machine opposite from that at which that cutting cycle began.

Through the button 76 and the lever 74 and push rods 72 associated therewith, the movement of the block 62 from one end of the slot 64 to the other, has also opened the initial one of the reversing switches 69 and closed the other one thereof so that upon the next actuation of the switch 51, the motor 15 will be energized in the opposite direction and will again advance toward the opposite end of the machine.

Having thus set forth the nature of this invention, what I claim herein is:

1. In a cutting machine, a fabric feed mechanism for feeding a fabric to be severed into predetermined lengths, drive means for said fabric feed mechanism, a carriage, means for mounting said carriage for movement widthwise of and adjacent a fabric fed by said fabric feed mechanism, a reversible drive means on said carriage, means connecting said reversible drive means to said carriage for driving said carriage upon operation of said reversible drive means, cutting means on said carriage and adapted to be actuated by said reversible drive means, measuring means responsive to the actuation of said fabric feed mechanism, means actuated by said measuring means after feeding a predetermined length of fabric for stopping said fabric feed mechanism and for initiating operation of said reversible drive means, reversing means for controlling the direction of operation of said reversible drive means, and means responsive to the completion of each traverse of said carriage for stopping said reversible drive means, for initiating operation of said fabric feed mechanism, and for operating said reversing means.

2. In a cutting machine, a fabric feed mechanism for feeding a fabric to be severed into predetermined lengths comprising a feed roll, drive means including an overrunning clutch for said feed roll, a carriage, means for mounting said carriage for movement widthwise of and adjacent a fabric fed by said feed roll, a reversible drive means on said carriage for driving said carriage upon operation of said reversible drive means, cutting means on said carriage and adapted to be actuated by said reversible drive means, measuring means responsive to the actuation of said feed roll, means actuated by said measuring means after feeding of a predetermined length of fabric for stopping said feed roll and for initiating operation of said reversible drive means, reversing means for said reversible means for controlling the direction of operation thereof, and means responsive to the completion of each traverse of said carriage for stopping said reversible drive means, for initiating operation of said feed roll, and for operating said reversing means.

3. In a cutting machine in accordance with claim 2, in which said measuring means comprises an endless measuring element responsive to the operation of said feed roll, and said means for stopping said feed roll comprises an abutment element on said measuring element and a releasable abutment member adapted to be engaged by said abutment element.

4. In a cutting machine, a fabric feed mechanism for feeding a fabric to be severed into predetermined lengths comprising a feed roll, drive means including an overrunning clutch for said feed roll, a carriage, means for mounting said carriage for movement widthwise of and adjacent a fabric fed by said feed roll, a reversible drive means on said carriage, means connecting said reversible drive means to said carriage for driving said carriage upon operation of said reversible drive means, cutting means on said carriage and adapted to be actuated by said reversible drive means, an endless measuring element connected to operate in unison with said feed roll, an abutment element carried by said endless element, a releasable abutment member adapted to be engaged by said abutment element for stopping said measuring element and feed roll, means responsive to the engagement of said abutment element and said abutment for initiating operation of said reversible drive means, reversing means for said reversible drive means for controlling the direction of operation thereof, and means actuated by engagement with said carriage at the completion of each traverse thereof for stopping said reversible drive means, for initiating operation of said feed roll, and for operating said reversing means.

5. In a cutting machine, a fabric feed mechanism for feeding a fabric to be severed into predetermined lengths comprising a feed roll, drive means including an overrunning clutch for said feed roll, a carriage, means for mounting said carriage for movement widthwise of and adjacent to a fabric fed by said feed roll, a reversible drive means on said carriage, means connecting said reversible drive means to said carriage for driving said carriage upon operation of said reversible drive means, cutting means on said carriage and adapted to be actuated by said reversible drive means, an endless measuring element connected to operate in unison with said feed roll, an abutment element carried by said endless element, a floating link having a free end adapted to be engaged by said abutment element for stopping said measuring element and feed roll, means responsive to the engagement of said abutment element and said floating link for initiating operation of said reversible drive means, reversing means for said reversible drive means for controlling the direction of operation thereof, and means actuated by engagement with said carriage at the completion of each traverse thereof for stopping said reversible drive means for operation of said feed roll, and for operating said reversing means, said means including an actuating rod connected to said floating link for moving the free end thereof clear of said abutment element upon endwise motion of said rod, and means actuated by said carriage upon the completion of each traverse for imparting endwise motion to said rod.

6. In a cutting machine in accordance with claim 5 in which said means for imparting endwise motion to said actuating rod comprises an endwise-shiftable rod engaged by said carriage at the completion of each traverse, and cam actuated means responsive to the endwise movement of said endwise-shiftable rod for imparting endwise motion to said actuating rod.

7. In a cutting machine in accordance with claim 6 in which said reversible drive means comprises a reversible electric motor, said means for initiating operation of and stopping said motor comprises a switch responsive to the movement of said floating link, and said reversing means comprises reversing switch means responsive to the endwise motion of said endwise-shiftable rod.

References Cited by the Examiner
UNITED STATES PATENTS

| | | | |
|---|---|---|---|
| 1,797,638 | 3/31 | Collins et al. | 83—111 |
| 2,272,215 | 2/42 | Lockett et al. | 83—484 X |
| 2,506,750 | 5/50 | Surprenant | 83—296 |
| 2,670,040 | 2/54 | Sayles | 83—484 |
| 2,713,904 | 7/55 | Ostuw et al. | 83—222 X |

ANDREW R. JUHASZ, *Primary Examiner.*